United States Patent
Sohn et al.

(10) Patent No.: US 6,650,052 B1
(45) Date of Patent: Nov. 18, 2003

(54) DIELECTRIC COLOR FILTER FOR AC DRIVEN PLASMA DISPLAY PANEL, METHOD FOR FABRICATING THE SAME AND PDP PANEL USING THE SAME

(75) Inventors: Sang-Ho Sohn, Daeku (KR); Byung-Gil Ryu, Seoul (KR); Myung-Ho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 251 days.

(21) Appl. No.: 09/613,906

(22) Filed: Jul. 11, 2000

(30) Foreign Application Priority Data

Jul. 12, 1999 (KR) .................. 10-1999-0028777

(51) Int. Cl.[7] .............................. H01J 17/49
(52) U.S. Cl. .............. 313/586; 313/582; 313/584
(58) Field of Search ............... 313/582, 584, 313/585, 586, 587

(56) References Cited

U.S. PATENT DOCUMENTS

| | | | |
|---|---|---|---|
| 4,126,807 A | * 11/1978 | Wedding et al. | 313/586 |
| 4,373,145 A | * 2/1983 | McCarthy et al. | 313/503 |
| 4,791,336 A | * 12/1988 | Morimoto et al. | 313/496 |
| 5,838,106 A | * 11/1998 | Funada | 313/587 |
| 5,905,334 A | * 5/1999 | Nakamura et al. | 313/491 |
| 6,066,917 A | * 5/2000 | Funada | 313/587 |
| 6,084,349 A | * 7/2000 | Ueoka et al. | 313/587 |
| 6,232,717 B1 | * 5/2001 | Oida et al. | 313/586 |
| 6,333,597 B1 | * 12/2001 | Mitomo | 313/489 |

* cited by examiner

*Primary Examiner*—Vip Patel
*Assistant Examiner*—Kevin Quarterman
(74) *Attorney, Agent, or Firm*—Fleshner & Kim, LLP

(57) ABSTRACT

Dielectric color filter for plasma display panel, method for fabricating the same and PDP panel using the same are disclosed. A dielectric color filter for a PDP for which neodymium oxide ($Nd_2O_3$), rare earth oxide, is added to an oxide dielectric solid powder having lead glass as a primary ingredient, a resulted material of which is melted and sintered to obtain a dielectric paste, and then the dielectric paste is coated and sintered by screen printing. By applying the dielectric color filter of the present invention to a PDP, the color purity of a fluorescent material can be optimized, and at the same time, the orange color light radiated from the neon discharge gas can be blocked, so that the color purity and the contrast are remarkably improved.

6 Claims, 2 Drawing Sheets

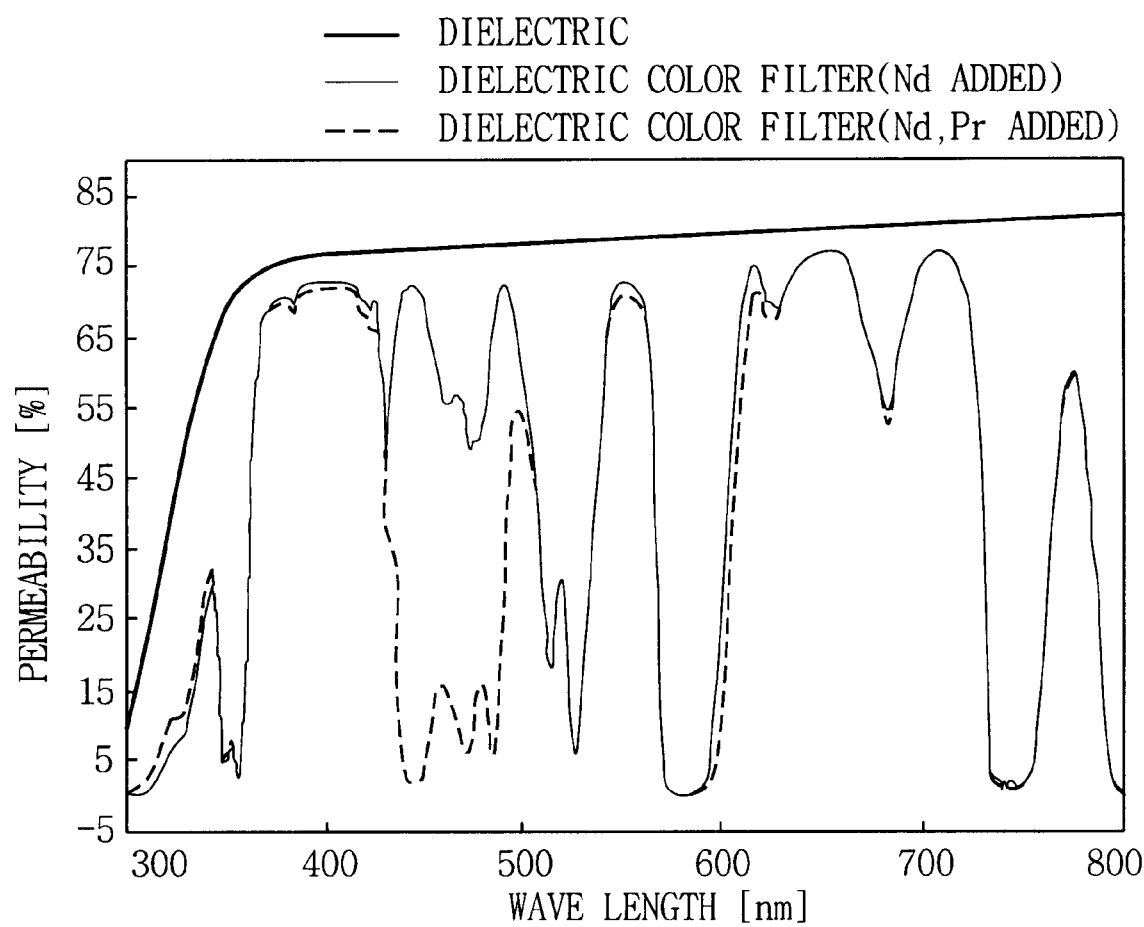

DIELECTRIC COLOR FILTER FOR AC DRIVEN PLASMA DISPLAY PANEL, METHOD FOR FABRICATING THE SAME AND PDP PANEL USING THE SAME

BACKGROUND OF THE INVENTION

1. Field of the Invention

The present invention relates to a dielectric color filter of an AC driven plasma display panel, and more particularly, to a dielectric color filter integrating a function of a transparent dielectric layer and that of a color filter among elements constructing an upper panel of a PDP, a method for fabricating the same, and a PDP panel using the same.

2. Description of the Background Art

FIG. 1 is a schematic view showing an AC driven plasma display panel (referred to as 'PDP', hereinafter) in accordance with a conventional art.

As shown in the drawing, an upper panel 100 and a lower panel 200 are separately fabricated and then attached to form a PDP.

The upper panel 100 includes a sustain electrode 2 formed on a front glass substrate 1 by vacuum coating, a glassy transparent dielectric layer 3 that is formed to limit current flowing in AC driving; and a protective film 4. As an oxide formed by vacuum deposition process, the protective film 4 protects the transparent dielectric layer 3 when gas is discharged and discharges surface electron to thereby lower a discharge voltage.

The lower panel 200 includes an address electrode formed on the upper surface of a rear glass substrate 5; a barrier rib 7 made of a black oxide, formed on the upper portion of the rear substrate and between the address electrodes 6; and a discharge cell 8 defined by the barrier ribs 7. The lower panel 200 also includes a fluorescent layer 9 formed on the side face and the bottom face of the discharge cell 8 by screen printing process. The fluorescent layer 9 radiates red color, green color and blue color.

The upper panel 100 and the lower panel 200 are attached to seal the discharge cell 8 which is filled with a mixture gas of xenon (Xe) and neon (Ne).

The operational principle of the PDP constructed as described above will now be explained.

When an AC power source is applied to the two electrodes 2 and 6, ultraviolet rays are generated from the xenon gas in the discharge cell due to a discharge phenomenon. The generated ultraviolet rays excite the fluorescent layer 9, so that a visible ray 10 of red color, green color and blue color that is capable of display characters or pictures is radiated externally from the front glass substrate.

However, the conventional PDP as described above has the following problems. That is, as state above, the discharge cell 8 is filled with the neon gas for lowering the discharge voltage and stabilizing discharging together with the xenon gas, a discharge gas. In this respect, however, the neon gas generates a orange-colored visible ray of which wave length of 585 nm when discharging occurs in the discharge cell, which degrades color purity and contrast of the PDP.

That is, since the orange color is mixed with the fluorescent color of the red, green and blue fluorescent material, the colors are not accurately reproduced.

In addition, the current technique fails to provide a satisfying level for reproducing the red, green and blue color perfectly. Besides, external light is considerably reflected on the surface of the panel.

With the PDP aiming at a wall type TV set for home use or a wide view monitor, the orange-colored light, the color purity related matter of the visible ray, the surface reflection of the external light are closely related to the display quality of the PDP, and in this sense, they negatively work on the PDP by degrading the contrast of the PDP.

In an effort to resolve the problems, a PDP having color filters as shown in FIG. 2 has been proposed.

FIG. 2 is a sectional view of an upper panel of an AC driven PDP adopting color filters in accordance with a conventional art.

As shown in the drawing, in order to improve the contrast, a red color filter 11, a green color filter 12 and a blue color filter 13 are thickly formed and sintered by screen printing between the, sustain electrode 2 and the dielectric layer 3, and a transparent glass or a black-colored glass 14 is filled between the color filters 11, 12 and 13.

As a material for the red color filter 11, an ferrite oxide inorganic pigment is typically used, and as a material for the red color filter 12 and the blue color filter 13, an inorganic pigment such as a cobalt oxide is typically used.

In case of screen printing, the inorganic pigment is mixed with a low-temperature degradable resin such as ethyl cellulose and organic solvent such as butyl carbitol acetate to obtain a paste, and then the red, green and blue color filters are thickly formed and sintered sequentially for three times.

Nevertheless, the PDP having color filters with the structure as shown in FIG. 2 exposes the following problems. That is, since the color filters for the PDP fabricated in the screen printing method in the conventional art should undergo thermal treatment of three times of sintering, the fabrication process is lengthened, consuming more materials, which causes an increase in a production cost and limitation for fabricating a large-scaled PDP.

In addition, the thermal treatment may cause a change in thermal and electrical characteristics of the front glass substrate 1 and the sustain electrode 2, or a chemical reaction may occur between the sustain electrode 2 and the transparent dielectric layer 3, which would shorten the durability of the display panel.

SUMMARY OF THE INVENTION

Therefore, an object of the present invention is to provide a dielectric color filter for a PDP integrating a dielectric layer and a color filter, and a method for fabricating the same.

Another object of the present invention is to provide a dielectric color filter for a PDP that is capable of remarkably improving color purity and contrast by blocking an orange-colored light radiated from a neon discharge gas, and a method for fabricating the same.

Still another object of the present invention is to provide a dielectric color filter for a PDP for which a transparent dielectric layer and a color filter are integratedly constructed to simplify its fabricating method, to reduce a production cost and to accomplish an excellent visible ray filter function, and a method for fabricating the same.

Yet another object of the present invention is to provide a PDP panel in which a dielectric color filter is used as a dielectric layer.

To achieve these and other advantages and in accordance with the purpose of the present invention, as embodied and broadly described herein, there is provided a dielectric color filter for a PDP for which neodymium oxide ($Nd_2O_3$), rare earth oxide, is added to an oxide dielectric solid powder having lead glass as a primary ingredient, a resulted material of which is melted and sintered to obtain a dielectric paste, and then the dielectric paste is coated by screen printing process and then sintered.

In order to achieve the above objects, there is also provided a dielectric color filter for a PDP for which neodymium oxide ($Nd_2O_3$) and praseodymium oxide ($Pr_2O_3$), each rare earth oxide, are added to an oxide dielectric solid powder having lead glass as a primary ingredient, a resulted material of which is melted and sintered to obtain a dielectric paste, and then the dielectric paste is coated by screen printing process and then and sintered.

In order to achieve the above objects, there is also provided a dielectric color filter for a PDP of which addition amount of each of neodymium oxide ($Nd_2O_3$) and praseodymium oxide ($Pr_2O_3$) for fabricating the dielectric color filter for a PDP is about 1~5 wt % to the oxide dielectric solid powder.

In order to achieve the above objects, there is also provided a method for fabricating a dielectric color filter for a PDP including the steps of: adding a neodymium oxide ($Nd_2O_3$), rare earth oxide, to an oxide dielectric solid powder having lead glass as a primary ingredient, to fabricate a mixture solid powder; melting and sintering the mixture solid powder in a platinum furnace at a temperature of about 1,100° C., to form synthetic glass; mixing the synthetic glass with terpineol organic solvent and ethyl cellulose resin, to obtain a dielectric color filter paste; and screen-printing the paste between a sustain electrode and a protective film of an upper panel of a PDP.

In order to achieve the above objects, in the step of fabricating the mixture solid powder of the method for fabricating a dielectric color filter for a PDP, praseodymium oxide ($Pr_2O_3$), rare earth oxide, is additionally mixed.

In order to achieve the above objects, there is also provided an AC driven PDP panel including a sustain electrode displayed on a substrate; a dielectric layer formed on the sustain electrode; and a protective film formed on the dielectric layer, of which the dielectric layer is functioned as a color filter for filtering a light of a specific wave length.

In order to achieve the above objects, the dielectric layer of the PDP panel refers to a dielectric color filter including a material for color filtering.

In order to achieve the above objects, the dielectric layer of the PDP panel is formed by repeatedly screen printing dielectric paste for several times, of which one process is for printing a dielectric color filter paste including a color filter.

In order to achieve the above objects, the dielectric layer of the PDP panel is formed by adding neodymium oxide and praseodymium oxide to oxide dielectric.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a graph of permeability (permeation spectrum) of the dielectric color filter in accordance with the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
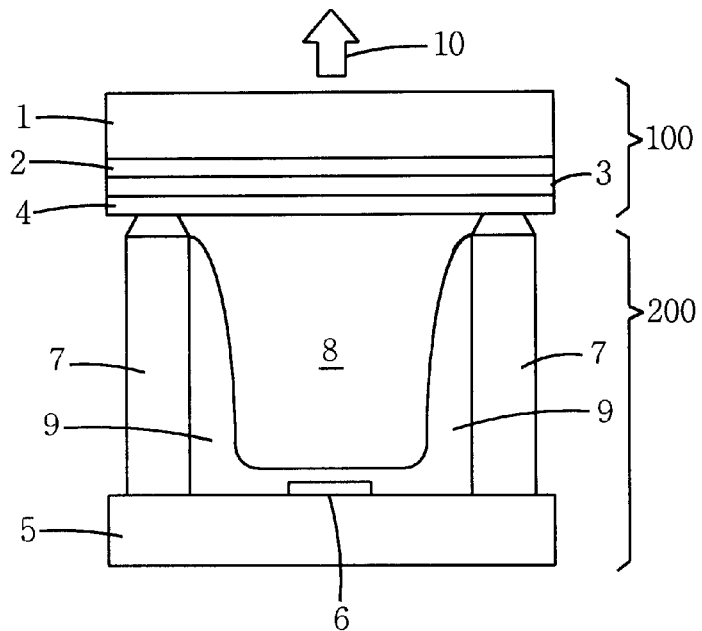
FIG. 1 is a sectional view of an AC driven plasma display panel in accordance with a conventional art.
Figure 2:
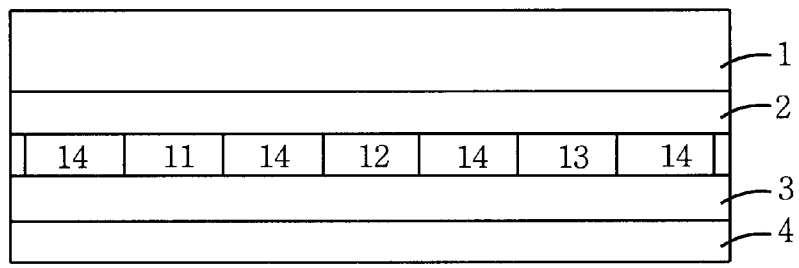
FIG. 2 is a sectional view of an upper panel of an AC driven PDP adopting color filters in accordance with a conventional art.
Figure 3:
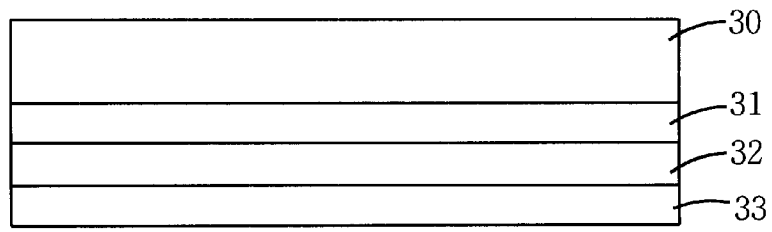
FIG. 3 is a sectional view of an upper panel of an AC driven plasma display panel mounting a dielectric color filter in accordance with the present invention.

FIG. 3 is a sectional view of an upper panel of an AC driven plasma display panel mounting a dielectric color filter in accordance with the present invention.

As shown in the drawing, an upper panel of a PDP in accordance with the present invention includes a front substrate 30, a sustain electrode 31 formed on one side of the front substrate 30; a dielectric color filter 32 formed on the sustain electrode 31 and on the front substrate 30, and a protective film 33 formed on the upper surface of the dielectric color filter.

The dielectric color filter 32 is functioned as a transparent dielectric layer serving to limit flowing of current between transparent electrodes and as a color filter optimizing a color purity of a fluorescent material and blocking orange light radiated from neon discharge gas, thereby enhancing the color purity and contrast. That is, the dielectric color filter 32 is a dielectric layer and color filter.

The method of fabricating the dielectric color filter for a PDP in accordance with the present invention will now be described.

A very small amount of neodymium oxide ($Nd_2O_3$) and praseodymium oxide ($Pr_2O_3$), each rare earth oxide, are added (5%~10% weight ratio) to an oxide dielectric solid powder (about 60 wt % of PbO, about 18 wt % of $SiO_2$, about 20 wt % of $B_2O_3$ and about 2 wt % of $Al_2O_3$) having lead glass as a primary ingredient, a resulted material of which is melted and sintered at a temperature of about 1,100° C. in a platinum furnace, and then ground to produce ground glass. In this respect, praseodymium oxide ($Pr_2O_3$) may not be added.

The ground glass is mixed with terpineol organic solvent and ethyl cellulose resin, to obtain a dielectric color filter paste.

The paste is coated on the sustain electrode of the upper panel of a PDP and on the upper surface of the front substrate by screen printing process and sintered, to form a dielectric color filter 32.

Generally, the dielectric layer of the PDP has 20 μm in thickness, the color filter has 5 μm in thickness. The thickness of a film that can be coated by screen printing is about 5~10 μm. Accordingly, the dielectric color filter in accordance with the present invention may be formed by screen printing the dielectric color filter paste for two or three times.

Or, the dielectric color filter in accordance with the present invention may also be formed in a manner that a general dielectric layer material that does not include neodymium oxide and praseodymium oxide, the ingredient functioning as a color filter, is screen-printed for one time or two times, on which the dielectric color filter paste is screen-printed for at least one time.

The dielectric color filter 32 fabricated by adopting the method as described above has a highly improved visible ray permeability as shown in a graph of FIG. 4.

As shown in FIG. 4, the dielectric color filter containing neodymium oxide ($Nd_2O_3$) mostly blocks orange light of which wavelength is 585 nm while having a sharp permeation peak of 450 nm (blue color), 485 nm (blue color), 545 nm (green color), 620 nm (red color), 650 nm (red color) without much loss with respect to permeability of the red, green and blue color light.

Accordingly, in case of using 450 nm $BaMgAl_{10}O_{17}$: Eu (blue color), 545 nm $YBO_3$: Tb (green color), 590 nm, 612 nm and 626 nm $Y_2O_3$: Eu (red color) as a fluorescent material, the dielectric color filter containing neodymium oxide ($Nd_2O_3$) has a desirable function of red, green and blue color filter as well as having the function as the dielectric.

When neodymium oxide ($Nd_2O_3$) and praseodymium oxide ($Pr_2O_3$) are added together by a very small amount, there is no variation in the permeation peak of the red color and the green color, while the 450 nm peak of the blue peak is considerably reduced to remain 485 nm peak.

Considering that the wave lengths of specific achromatic lights for the red, green and blue color are 650 nm, 545 nm and 480 nm, respectively, the dielectric color filter containing neodymium oxide ($Nd_2O_3$) and praseodymium oxide ($Pr_2O_3$) also has an excellent effect as a color filter plus the function of dielectric.

Referring to neodymium oxide ($Nd_2O_3$) and praseodymium oxide ($Pr_2O_3$) used for the present invention, since the light absorption of neodymium (Nd) and praseodymium (Pr) is made by transition of inner-shell electrode that is electrostatically shielded and almost not varied for any oxide, they may be added to oxide having $SiO_2$, $Al_2O_3$ or $In_2O_3$ as primary ingredients to form a thick film or a thin film with the same effect as well as being used for the dielectric ingredient for the PDP.

Accordingly, the dielectric color filter of the present invention is adoptable to an organic/inorganic electroluminescence (EL), an electric field emission display (FED) or a thick film-type electroluminescence array (ELA), all have an upper panel in a similar structure to that of PDP and are flat panel for displaying data by using light emitting of the fluorescent material.

The organic EL device is structured in that silicon oxide ($SiO_2$) dielectric layer is formed between a substrate and a transparent electrode and the light of red, green and blue color radiated from an organic fluorescent material below the discharge cell permeates the silicon oxide layer.

As to the inorganic EL device, a dielectric layer such as Aluminum oxide ($Al_2O_3$) is formed between a transparent electrode and an inorganic fluorescent material and light of red, green and blue color radiated from the inorganic fluorescent material permeates the dielectric layer to come out.

Meanwhile, in case of the electric field emission display (FED) device, silicon oxide ($SiO_2$) dielectric layer is formed between a substrate and a transparent electrode and light of red, green and blue color radiated from an inorganic fluorescent material below the discharge cell permeates the silicon oxide layer.

As mentioned above, in the flat display panel having an oxide dielectric between the substrate and the fluorescent material of the upper panel, the color purity of red, green and blue color fluorescent material is optimized when the very small amount of neodymium oxide ($Nd_2O_3$) and praseodymium oxide ($Pr_2O_3$) is added to the oxide dielectric layer, thereby improving the contrast.

As so far described, in the present invention, neodymium oxide ($Nd_2O_3$) and praseodymium oxide ($Pr_2O_3$) are added to the dielectric ingredient for a PDP, melted and sintered to obtain a dielectric glass, which is mixed with a solvent and a resin to make a paste which is then thickly formed and sintered, thereby forming a dielectric color filter. Thus, its fabricating method is very simple as well as reducing its production cost. Also, the dielectric color filter has an excellent visible ray filter function.

That is, in comparison, the conventional art is unfavorable in that a color filter is formed on a front substrate of a PDP, and then the dielectric layer is to be formed. In addition, since red, green and blue color filters are separatedly fabricated to form on the front substrate of a PDP, its processes are very complicated. Besides, since the PDP panel is to be exposed to high temperature processes for several times, the panel is curved. Also, due to a chemical reaction between the panel and an electric material, reliability of the PDP is degraded.

However, in the present invention, by using the dielectric color filter for a PDP, it is not necessary to form red, green and blue color filters separatedly, and the dielectric layer does not need to be coated additionally. That is, the dielectric color filter for a PDP of the present invention is just coated on the front substrate of the upper panel of a PDP and sintered, so that the processes are quite simple. Moreover, the PDP panel undergoes the high temperature process by less times than in the conventional art, so that in case of fabricating a PDP by using the dielectric color filter for a PDP of the present invention, a reliability of the PDP is highly improved.

Furthermore, by applying the dielectric color filter of the present invention to a PDP, the color purity of a fluorescent material can be optimized, and at the same time, the orange color light radiated from the neon discharge gas can be blocked; so that the color purity and the contrast are remarkably improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A plasma display panel, comprising:
   an upper panel;
   a lower panel spaced apart from and parallel to the upper panel;
   sustain electrodes on the upper panel;
   a color filtering dielectric layer on the sustain electrodes; and
   barrier ribs on the lower panels, wherein the barrier ribs form discharge cells between the upper and lower panels, and wherein the discharge cells are filled with gas, wherein the color filtering dielectric layer comprises about 5%–10% weight ratio of color filtering oxide, wherein the remainder of the color filtering dielectric comprises about 60 wt % PbO, about 18 wt % $SiO_2$, about 20 wt % $B_2O_3$ and about 2 wt % $Al_2O_3$.

2. The plasma display panel of claim 1, wherein the gas comprises neon (Ne) and wherein the color filtering dielectric layer filters discharged light from the neon gas.

3. The plasma display panel of claim 1, wherein the color filtering dielectric layer comprises an oxide which filters visible light with a wavelength of about 585 nm.

4. The plasma display panel of claim 1, wherein the color filtering dielectric layer blocks orange light emitted from the gas in the discharge cells and limits current flow between sustain electrodes in the upper panel.

5. The plasma display panel of claim 1, wherein the color filtering oxide comprises $Nd_2O_3$.

6. The plasma display panel of claim 1, wherein the color filtering oxide comprises $Nd_2O_3$ and $Pr_2O_3$.

* * * * *